(12) United States Patent
Han (10) Patent No.: US 12,531,506 B2
(45) Date of Patent: Jan. 20, 2026

(54) INSTALLATION METHOD AND INSTALLATION EQUIPMENT FOR PHOTOVOLTAIC MODULE IN PHOTOVOLTAIC FIELD AREA, AND PHOTOVOLTAIC ARRAY

(71) Applicant: Hunan Sunmotive Co., Ltd., Changsha (CN)

(72) Inventor: Chunhua Han, Yangzhou (CN)

(73) Assignee: Hunan Sunmotive Co., Ltd., Changsha (CN)

( * ) Notice: Subject to any disclaimer, the term of this patent is extended or adjusted under 35 U.S.C. 154(b) by 0 days.

(21) Appl. No.: 18/437,261

(22) Filed: Feb. 9, 2024

(65) Prior Publication Data

US 2024/0186940 A1    Jun. 6, 2024

Related U.S. Application Data

(63) Continuation of application No. PCT/CN2021/122745, filed on Oct. 9, 2021.

(30) Foreign Application Priority Data

Aug. 12, 2021    (CN) .......................... 202110923427.9

(51) Int. Cl.
*H02S 20/30*     (2014.01)
*B66D 1/30*      (2006.01)
*H10F 19/20*     (2025.01)

(52) U.S. Cl.
CPC ............. *H02S 20/30* (2014.12); *B66D 1/30* (2013.01); *H10F 19/20* (2025.01)

(58) Field of Classification Search
CPC ............ H02S 10/40; F24S 2025/017; F24S 2030/133
See application file for complete search history.

(56) References Cited

U.S. PATENT DOCUMENTS

| | | | |
|---|---|---|---|
| 4,042,116 A * | 8/1977 | Bertolino ............... | B62D 49/02 212/196 |
| 2014/0261637 A1* | 9/2014 | Okandan ................ | H02S 20/10 136/251 |

(Continued)

FOREIGN PATENT DOCUMENTS

| | | | | |
|---|---|---|---|---|
| CN | 105207570 A | 12/2015 | | |
| CN | 205545095 U * | 8/2016 | ............ | H02S 20/30 |

(Continued)

OTHER PUBLICATIONS

Carl Stahl Sava Industries, "Stainless Steel Wire Rope vs Galvanized Steel Wire Rope", https://www.savacable.com/blog/stainless-steel-wire-rope-vs-galvanized-steel-wire-rope, 2019, All Pages. (Year: 2019).*

(Continued)

*Primary Examiner* — Daniel P Malley, Jr.
(74) *Attorney, Agent, or Firm* — Central California IP Group, P.C.; Andrew D. Fortney (57) ABSTRACT

Disclosed are an installation method and installation equipment for a photovoltaic module in a photovoltaic field area, and a photovoltaic array, applied in the technical field of photovoltaic installation. The installation method includes determining a photovoltaic field area and laying a traction rope; mounting a photovoltaic module on the traction rope and feeding the traction rope, until arriving at an installation area; securing two ends of the traction rope; and moving to a next installation position and repeating to carry out installation. The installation equipment includes an unwinding device, a traction rope, a winding device, a photovoltaic support, a stock bin, an unloading apparatus, a snap-fit structure and a track. The method can carry out large-scale and batch installation in a photovoltaic field area, the process is standardized, and quality of installation is ensured, (Continued)

thereby achieving process-oriented processing, reducing labor input, saving costs, and implementing cost-effective batch installation.

18 Claims, 3 Drawing Sheets

(56) References Cited

U.S. PATENT DOCUMENTS

| | | | |
|---|---|---|---|
| 2016/0065116 A1* | 3/2016 | Conger | H02S 20/10 |
| | | | 136/251 |
| 2016/0329858 A1* | 11/2016 | Stoddard | H02S 20/20 |
| 2021/0206003 A1* | 7/2021 | Zhou | B25J 9/1664 |

FOREIGN PATENT DOCUMENTS

| | | |
|---|---|---|
| CN | 205693608 U | 11/2016 |
| CN | 207988375 U | 10/2018 |
| CN | 211568245 U | 9/2020 |
| CN | 215316780 U | 12/2021 |
| JP | 2021083204 A | 5/2021 |

OTHER PUBLICATIONS

Jordan, "Does Stainless Steel Rust & What Does it Mean for Your Outdoor Kitchen?", https://brownjordanoutdoorkitchens.com/blog/stainless-steel-rust/, 2020, All Pages. (Year: 2020).*

International Search Report, International Appl. No. PCT/CN2021/122745, dated Mar. 24, 2022; China National Intellectual Property Administration, Beijing, China.

\* cited by examiner

S1, Determine an installation area of a photovoltaic field area, and lay a traction rope traversing the installation area from a first side to an opposite second side of the installation area;

↓

S2, Feed the traction rope from the first side of the installation area to the second side thereof, mount photovoltaic modules on the traction rope at the first side of the installation area, move the photovoltaic modules along with the traction rope, feed until a row of photovoltaic modules is moved to the installation area, and then stop;

↓

S3, Secure two ends of the traction rope at the first side and the second side of the installation area, respectively, to complete installation of a row of photovoltaic modules.

Fig. 1

S1, Determine an installation area of a photovoltaic field area, and lay a traction rope traversing the installation area from a first side to an opposite second side of the installation area;

S2, Feed the traction rope from the first side of the installation area to the second side thereof, mount photovoltaic modules on the traction rope at the first side of the installation area, move the photovoltaic modules along with the traction rope, feed until a row of photovoltaic modules is moved to the installation area, and then stop;

S3, Secure two ends of the traction rope at the first side and the second side of the installation area, respectively, to complete installation of a row of photovoltaic modules;

S4, Move to an installation position parallel to a previous row of photovoltaic modules, re-arrange the traction rope, complete the installation of a next row of photovoltaic modules according to Steps S2-S3, and repeat this step until all the photovoltaic modules in the installation area are installed

INSTALLATION METHOD AND INSTALLATION EQUIPMENT FOR PHOTOVOLTAIC MODULE IN PHOTOVOLTAIC FIELD AREA, AND PHOTOVOLTAIC ARRAY

CROSS-REFERENCE TO RELATED APPLICATIONS

This application is a continuation of International Pat. Appl. No. PCT/CN2021/122745, filed on Oct. 9, 2021, which claims priority to Chinese Pat. Appl. No. 202110923427.9, filed on Aug. 12, 2021, the contents of each of which are incorporated by reference herein in their entireties.

TECHNICAL FIELD

The present invention relates to the field of photovoltaic mounting technology and in particular to an installation method, an installation equipment and a photovoltaic array for a photovoltaic module in a photovoltaic field area.

BACKGROUND ART

At present, the construction of solar photovoltaic power station and the installation of photovoltaic modules are still mainly based on human resources. The factors such as GW-scale base construction mode, large-scale module and aging labor resources deepen the urgency of comprehensive mechanization and automation requirements of photovoltaic power station. Thus, a new construction method and equipment of photovoltaic power station are derived.

The array unit of the existing photovoltaic power station is mainly composed of a steel structure supporting system, modules and a matched electrical system. The steel structure supporting system is mainly composed of hot-dip galvanized steel section bars by means of bolting/welding. Each MW-class photovoltaic system often includes the installation of tens of thousands of components. Migrant workers are the main installation resources, consuming a lot of manpower and material resources. It has low installation efficiency and is difficult to ensure the installation quality.

According to the existing installation methods, principally, workers go to the construction site and install photovoltaic modules one by one into the photovoltaic field area. If a large area of photovoltaic field area is installed and the amount of engineering is large, it will consume a lot of manpower and material resources and it cannot achieve economy and high-efficiency, batch installation and commercial application. The quality of manual installation cannot be stably guaranteed. In addition, the existing manual installation does not standardize the land use of photovoltaic field area, and cannot reasonably arrange photovoltaic modules, which is easy to cause land waste. Existing installation methods are also prone to contaminate the photovoltaic field area and it is inconvenient to clean the field.

SUMMARY OF THE INVENTION

The object of the present invention is to overcome the shortcomings existing in the prior art of not achieving batch installation and commercial application, and provide an installation method, an installation equipment and a photovoltaic array for a photovoltaic module in a photovoltaic field area. Large-scale and batch installation is performed in a photovoltaic field area, the installation process is standardized, and quality of installation is ensured, thereby achieving process-oriented processing, reducing labor input, saving costs, and implementing cost-effective batch installation.

In order to achieve the purpose, the invention provides the following technical solutions.

An installation method for a photovoltaic module in a photovoltaic field area comprises the steps of:

S1, determining an installation area of a photovoltaic field area, and laying a traction rope traversing the installation area from a first side to an opposite second side of the installation area; laying a traction rope to provide a basis for installing a photovoltaic module, reduce the difficulty of installation, and provide conditions for large-scale and batch installation; by covering the installation area by the traction rope, enabling the photovoltaic module to be completely laid in the photovoltaic field area during the installation process, and facilitating the large-scale installation of the photovoltaic module;

S2, feeding the traction rope from the first side of the installation area to the second side thereof, mounting photovoltaic modules on the traction rope at the first side of the installation area, moving the photovoltaic modules along with the traction rope, feeding until a row of photovoltaic modules is moved to the installation area, and then stopping; wherein the traction rope can be fed to the installation area of the photovoltaic field area by the feeding cooperation of the traction rope, so that the photovoltaic module can be transported to the whole installation area for installation, and a large number of photovoltaic modules can be installed; by stable feeding, the whole process is flow-processed, the installation process is standardized and it is stably transported; and the installation accuracy of the position and direction thereof is higher, and the installation quality is ensured;

S3, securing two ends of the traction rope at the first side and the second side of the installation area, respectively, to complete the installation of the row of photovoltaic modules; by fixing the two ends of the traction rope, the installation may be completed, which reduces the manpower input and saves the cost, wherein the installation process is simpler, thus achieving an economical and efficient batch installation;

In a preferred embodiment of the invention, the installation of a next row or more rows of photovoltaic modules further comprises the steps of:

S4, moving to an installation position parallel to a previous row of photovoltaic modules, re-arranging the traction rope, complete the installation of a next row of photovoltaic modules according to Steps S2-S3, and repeating this step until all the photovoltaic modules in the installation area are installed; wherein by moving and re-arranging the traction rope, the whole process is flow-processed, and the installation process is standardized, so as to facilitate the installation of the photovoltaic module at the next installation position, and then install a complete photovoltaic field area and accurately position each installation position, so as to ensure that the installation of the photovoltaic module at the whole installation area is successfully completed.

In the preferred embodiment of the present invention, in the above-mentioned steps S2-S3, the traction rope is always kept in a tensioned state from the feeding process until the installation is completed. By maintaining the tension state of the traction rope, the two ends thereof are substantially in a horizontal position. The photovoltaic module can be installed in a horizontal direction. The position is maintained horizontally after installation, providing a smooth installation environment for the photovoltaic module.

In a preferred embodiment of the present invention, in the above-mentioned Step S2, when the photovoltaic modules are installed on the traction rope, a plurality of photovoltaic modules are installed in sequence as a group; at least one photovoltaic module is installed each time, photovoltaic modules of adjacent groups are installed at intervals; the photovoltaic modules are placed in sequence on the traction rope for installation, ensuring that the photovoltaic modules are orderly arranged, so that the photovoltaic modules are arranged in an array structure, forming an effective working area. The installation is more standardized.

In a preferred embodiment of the present invention, in the above-mentioned Step S1, at least two traction ropes are laid; the distance between adjacent traction ropes is less than the length or width of one photovoltaic module, and the distance between adjacent traction ropes remains unchanged; and the distance between the traction ropes is limited so that the traction ropes can be kept at the bottom of the photovoltaic module, providing a foundation for the photovoltaic module and keeping the photovoltaic module smooth.

In a preferred embodiment of the present invention, in the above-mentioned step S2, an unwinding device is arranged on a first side of the installation area; a winding device is arranged on a second side of the installation area; two ends of the traction rope are respectively connected to the unwinding device and the winding device; the traction rope is fed by the unwinding device, and the winding device synchronously receives the traction rope to complete the feeding of the traction rope from the first side to the second side; and in Step S3, the traction rope is firstly disconnected from the unwinding device and the winding device, and then both ends of the traction rope are fixed; by providing the unwinding device and the winding device, the traction rope can be synchronously fed, the unwinding device provides the feeding of the traction rope, and the winding device receives the traction rope to complete synchronization, so that the traction rope remains in a tensioned state; furthermore, the unwinding device and the winding device are respectively provided with a servo motor for adjusting the speed of the unwinding device and the winding device for the traction rope, facilitating transmission regulation and control, and maintaining transmission synchronization.

In the preferred embodiment of the present invention, in the above-mentioned step S2, a track is provided on a first side and a second side of the installation area, respectively, and the unwinding device and the winding device are installed on the track; and the unwinding device and the winding device are movable relative to the installation area in a sliding manner; by means of track sliding, the movement of the unwinding device and the winding device is facilitated. The next installation position is accurately located, the installation is more accurate, and the installation quality is improved.

In a preferred embodiment of the present invention, in the above-mentioned Step S1, before the traction rope are laid, the installation area is laid with a plurality of photovoltaic supports; the traction ropes rest on the photovoltaic supports; and the feeding direction of the traction ropes coincides with the arrangement direction of the plurality of photovoltaic supports. By arranging the photovoltaic support in the photovoltaic field area to provide a supporting structure for installing the photovoltaic module, a sufficient supporting force of the photovoltaic module between adjacent photovoltaic supports is ensured, the photovoltaic module is supported firmly on the photovoltaic support, and the horizontal position of the photovoltaic module is maintained without inclination.

An installation equipment for a photovoltaic module in a photovoltaic field area is capable of using the above-mentioned installation method, comprising an unwinding device, a traction rope, a winding device, a photovoltaic support, a stock bin, an unloading apparatus, a snap-fit structure and a track; wherein the plurality of photovoltaic supports are provided at intervals in an installation area of the photovoltaic field area; at least two traction ropes together traverse the plurality of photovoltaic supports; the unwinding device and the winding device are respectively provided at two ends outside the photovoltaic field area; the bottoms of the unwinding device and the winding device are respectively provided with a track along the edge direction of the installation area; the two ends of the traction rope are respectively connected to the unwinding device and the winding device, wherein the unwinding device is used for feeding the traction rope, and the winding device is used for receiving the traction rope; the stock bin and the unloading apparatus are mounted beside the unwinding device; a plurality of photovoltaic modules are placed in the stock bin; the unloading apparatus is used for transferring the photovoltaic modules from the stock bin to the traction rope; and the snap-fit structure is used for clamping and fixing the photovoltaic modules and the traction rope. By placing the photovoltaic module on the traction rope via the unloading apparatus, the photovoltaic module is stably assembled with the traction rope via the snap-fit structure. The synchronous transferring is performed by the unwinding device and the winding device, providing implementation conditions for batch installation, so as to facilitate large-scale installation of the photovoltaic module.

A photovoltaic array for a photovoltaic module in a photovoltaic field area is obtained using the above-mentioned installation method, comprising at least two traction ropes and at least one row of photovoltaic modules in a photovoltaic field area, wherein one row of the photovoltaic modules is divided into multiple groups; each group of photovoltaic modules is arranged along the direction of the traction ropes, and adjacent groups of photovoltaic modules have a spacing therebetween; and all the photovoltaic modules are arranged in an array on the traction ropes. By using the installation method, a photovoltaic array arranged in a plurality of rows and columns is obtained, covering the photovoltaic field area, providing a large-area photovoltaic module working area.

The invention has the following beneficial effects compared to prior art.

1. By means of the installation method, the traction rope is laid in the photovoltaic field area, and a batch of photovoltaic modules are successively installed in the photovoltaic field area by using winding and unwinding and the cooperation of each other. A standard photovoltaic module array is formed by repeatedly installing at a mobile position, so that a large-scale and batch installation may be performed in the photovoltaic field area, and the installation process is standardized and the installation quality is ensured by carrying out a process treatment according to Steps S1-S5. Meanwhile, it achieves process-oriented processing, reduces labor input, saving costs, and implements cost-effective batch installation.

2. By means of the installation equipment, a complete set of installation mechanical structure is provided to facilitate the installation of photovoltaic modules and provide the feasibility for the mechanized and automated installation of photovoltaic field area.

3. By means of the photovoltaic array, it can cover the photovoltaic field area, provide a large area of photovoltaic module working area, realize the construction of photovoltaic field area, and provide protection for the subsequent conversion of electrical energy.

Reference numerals in the drawings: 1—unwinding device; 2—unloading apparatus; 3—stock bin; 4—winding device; 5—traction rope; 6—photovoltaic support; 7—track; 8—photovoltaic module; 81—photovoltaic panel; 9—snap-fit structure.

DETAILED DESCRIPTION

Hereinafter, the present invention will be described in further detail with reference to experimental examples and detailed description. However, it should not be understood that the scope of the above-described subject matter of the present invention is limited to the following examples. All the technologies achieved on the basis of the invention fall within the scope of the invention.

Embodiment 1

Figure 1:
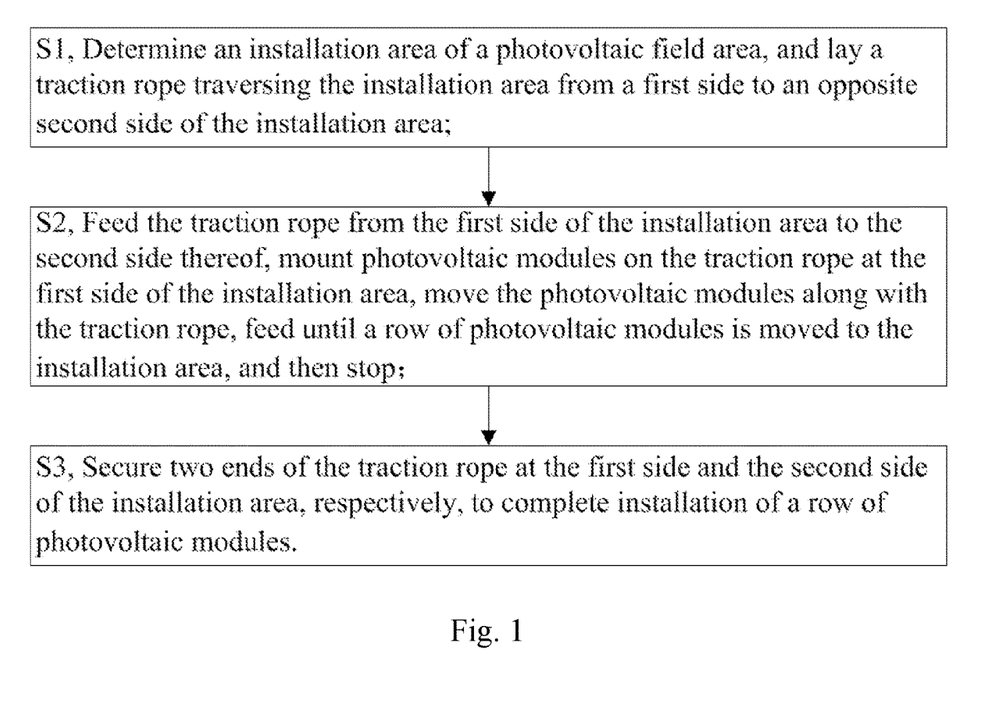
FIG. 1 is a step diagram of an installation method for a photovoltaic module in a photovoltaic field area according to Embodiments 1 and 2 of the present invention.

Referring to FIG. 1, the present embodiment provides an installation method for a photovoltaic module in a photovoltaic field area including the following steps:
S1, an installation area of a photovoltaic field area is determined, where the installation area is rectangular; two traction ropes 5 traversing the installation area are laid from a first side of the installation area to a second side at an opposite position, namely, in the direction of two ends of the rectangle of the installation area, and the two traction ropes 5 are provided in parallel; the traction rope 5 is laid, providing a basis for installing the photovoltaic module 8, reducing the difficulty of installation, and providing conditions for large-scale and batch installation; and the installation area is covered by the traction rope 5, enabling the photovoltaic module 8 to be completely laid in the photovoltaic field area during the installation process, and facilitating the large-scale installation of the photovoltaic module 8;
S2, when the traction rope 5 is fed from the first side to the second side of the installation area, there is a worker standing at the first side of the installation area and transmits the traction rope 5 to the second side; there is another worker standing at the second side of the installation area and receives the traction rope 5 at the same speed, the traction rope 5 being in a tensioned state in the installation area; at the first side of the installation area, the worker installs the photovoltaic module 8 on the traction rope 5 and fixes the photovoltaic module 8 and the traction rope 5, where they can be fixed by means of screwing wires, bolts or other parts for fixing; the photovoltaic module 8 moves as the traction rope 5 is fed, until the worker synchronously moves a row of photovoltaic modules 8 to the installation area, stopping feeding; the traction rope 5 can be fed to the installation area of the photovoltaic field area by the feeding cooperation of the traction rope 5, so as to transport the photovoltaic module 8 to the whole installation area for installation, which can realize the installation of a large number of photovoltaic modules 8; by stable feeding, the whole process is flow-processed, the installation process is standardized and it is stably transported; and the installation accuracy of the position and direction thereof is higher, and the installation quality is ensured;
S3, the worker fixes the two ends of the traction rope 5 on the first side and the second side of the installation area respectively, and the worker can fix the two ends of the traction rope 5 on the ground of the installation area respectively by means of pins, bolts and welding, so as to complete the installation of a row of photovoltaic modules 8; and by fixing the two ends of the traction rope 5, the installation may be completed, which reduces the manpower input and saves the cost, wherein the installation process is simpler, thus achieving an economical and efficient batch installation.

Embodiment 2

This embodiment is similar to Embodiment 1, but uses different hardware equipment to aid the installation, with the main differences of a photovoltaic support 6, an unwinding device 1, a winding device 4, an unloading apparatus 2, etc.

The embodiment provides an installation method for a photovoltaic module in a photovoltaic field area including the following steps:
S1, according to the planning and design drawing, an installation area of the photovoltaic field area is determined to make a demarcation; traction ropes 5 traversing the installation area are laid from a first side of the installation area to an opposite second side, and a plurality of photovoltaic supports 6 are laid at intervals in the installation area; the photovoltaic support 6 is a support structure and can play a supporting role, with various shapes; the photovoltaic support 6 can be fixed on the ground or the roof, and can also be fixed on a platform erected in the air; the photovoltaic support 6 is used for resting the traction rope 5 on the top thereof; after the installation is completed, the photovoltaic support 6 also facilitates the fixing of the traction rope 5; the transmission direction of the traction rope 5 is consistent with the arrangement direction of the photovoltaic support 6; the extension direction of a single photovoltaic support 6 intersects with the transmission direction of the traction rope 5 at an angle of ≥10°, which is 90° in the present embodiment, namely, the photovoltaic support 6 is perpendicular to the traction rope 5; the traction rope 5 is laid, providing a basis for installing the photovoltaic module 8, reducing the difficulty of installation, and providing conditions for large-scale and batch installation; and the installation area is covered by the traction rope 5, enabling the photovoltaic module 8 to be completely laid in the photovoltaic field area during the installation process, and facilitating the large-scale installation of the photovoltaic module 8;

S2, an unwinding device 1 is arranged at one end outside the photovoltaic field area and an unwinding device 4 is arranged at the other end along the direction traversing the installation area; the unwinding device 1 releases at least two traction ropes 5 and receives same to the winding device 4; the number of the traction ropes 5 may be two, three, four, etc., with two traction ropes 5 used in the present embodiment; the traction ropes 5 are kept horizontal, the unwinding device 1 and the winding device 4 are located at the same horizontal height, so that the horizontal installation of the photovoltaic module 8 may be ensured; the traction ropes 5 are fed from the first side to the second side of the installation area via the unwinding device 1; the photovoltaic module 8 is mounted on the traction rope 5 at the first side of the installation area; the photovoltaic module 8 is fixed with the traction rope 5 via a snap-fit structure 9, and the photovoltaic module 8 is moved as the traction rope 5 advances until a row of photovoltaic modules 8 are moved to the installation area; however, the unwinding device 1 and the winding device 4 are both existing products for winding the traction rope 5, where the traction rope 5 is made of a metal material, and may be made of iron, aluminum, copper or a metal wire made of an alloy; the traction rope 5 in the present embodiment is a ferruginous steel rope; the traction rope 5 spans the whole photovoltaic field area and is in a tensioned state; ideally, the traction rope 5 is straightened by the unwinding device 1 and the winding device 4; in fact, due to the influence of gravity, the traction rope 5 is slightly arc-shaped and curved; the distance between adjacent traction ropes 5 is less than the length or width of one photovoltaic module 8; in the present embodiment, the photovoltaic module 8 is arranged longitudinally perpendicular to the direction of the traction ropes 5; the distance between two traction ropes 5 is less than the length of the photovoltaic module 8, namely, two connection points between the traction ropes 5 and the photovoltaic module 8 are located inside the whole photovoltaic module 8, and the distance between adjacent traction ropes 5 remains unchanged.

The feeding of the traction rope 5 is realized via the output traction rope 5 of the unwinding device 1 and the input traction rope 5 of the winding device 4; the unwinding device 1 and the winding device 4 are synchronously started to keep the traction rope 5 in the tensioned state and transmit at a constant speed; the unwinding device 1 and the winding device 4 are respectively provided with a servo motor; the unwinding speed of the unwinding device 1 is controlled by the servo motor; and the winding speed of the winding device 4 is controlled by the servo motor; that is to say, the unwinding device 1 and the winding device 4 unwind and wind the traction rope 5 at the same speed so as to keep the unwinding device 1 and the winding device 4 synchronously unwinding and winding the traction rope 5 at the same time; it is convenient to adjust the speed of the traction rope 5 to transmit at a constant speed, so that a plurality of photovoltaic modules 8 are successively placed on the traction rope 5 for transmission until the photovoltaic modules 8 are laid between adjacent photovoltaic supports 6; a plurality of photovoltaic modules 8 are placed in the stock bin 3, the stock bin 3 is pre-placed beside the unwinding device 1, and the photovoltaic modules 8 are placed on the traction rope 5 from the stock bin 3 by using the unloading apparatus 2; the unloading apparatus 2 is a mechanical hand, and the photovoltaic module 8 is transferred to and fixed on the traction rope 5 via the mechanical hand; when the photovoltaic modules 8 is placed on the traction rope 5, a plurality of photovoltaic modules 8 are placed into one group, such as 3-10 into one group, where adjacent photovoltaic modules 8 in each group have gaps between them, the size of the gaps being 1 mm-10 cm, and adjacent groups of photovoltaic modules 8 have intervals between them, the size of the intervals being 0.05 m-0.5 m; when the photovoltaic module 8 is placed, the photovoltaic module 8 and the traction rope 5 are clamped and fixed by a snap-fit structure 9; four snap-fit structures 9 are attached to the bottom surface of the photovoltaic module 8 and are pre-set; the snap-fit structure 9 has a notch for clamping and fixing the traction rope 5 therein; the snap-fit structure 9 is of a special design, the notch is of a special shape, and the shape of the notch is bent so as to clamp the traction rope 5; after the mechanical hand grabs the photovoltaic module 8, the positions of the two snap-fit structures are directly opposite to the two traction ropes 5, and then the mechanical hand travels along a bent path, so that the traction rope 5 is clamped along the bent notch into an innermost end of the notch; the traction rope 5 can be fed to the installation area of the photovoltaic field area by the feeding cooperation of the traction rope 5, so as to facilitate the transportation of the photovoltaic module 8 to the whole installation area for installation, which can realize the installation of a large number of photovoltaic modules 8; by stable feeding, the whole process is flow-processed, the installation process is standardized and it is stably transported; the installation accuracy of the position and direction thereof is higher, and the installation quality is ensured; and after the feeding is completed, the unwinding device 1 and the winding device 4 are stopped and the traction ropes 5 are no longer fed.

S3, two ends of the traction rope 5 are separated from the unwinding device 1 and the winding device 4 and respectively fixed on the first side and the second side of the installation area; during the separation, the traction rope 5 located at one end of the winding device 4, namely, a front end of the traction rope 5, is firstly fixed at a boundary edge of the photovoltaic field area, or the last photovoltaic support 6 is bound and fixed with the traction rope 5, then the front end of the traction rope 5 is cut off, the pre-stressed steel cable is bound and fixed on the photovoltaic support 6, and finally the rear end of the traction rope 5 is cut off from the unwinding device 1, so that the traction rope 5 is locked and fixed at both ends of the photovoltaic field area, with the installation of a row of photovoltaic modules 8 finished; and by fixing the two ends of the traction rope 5, the installation may be completed, which reduces the manpower input and saves the cost, wherein the installation process is simpler, thus achieving an economical and efficient batch installation.

Embodiment 3

Figure 2:
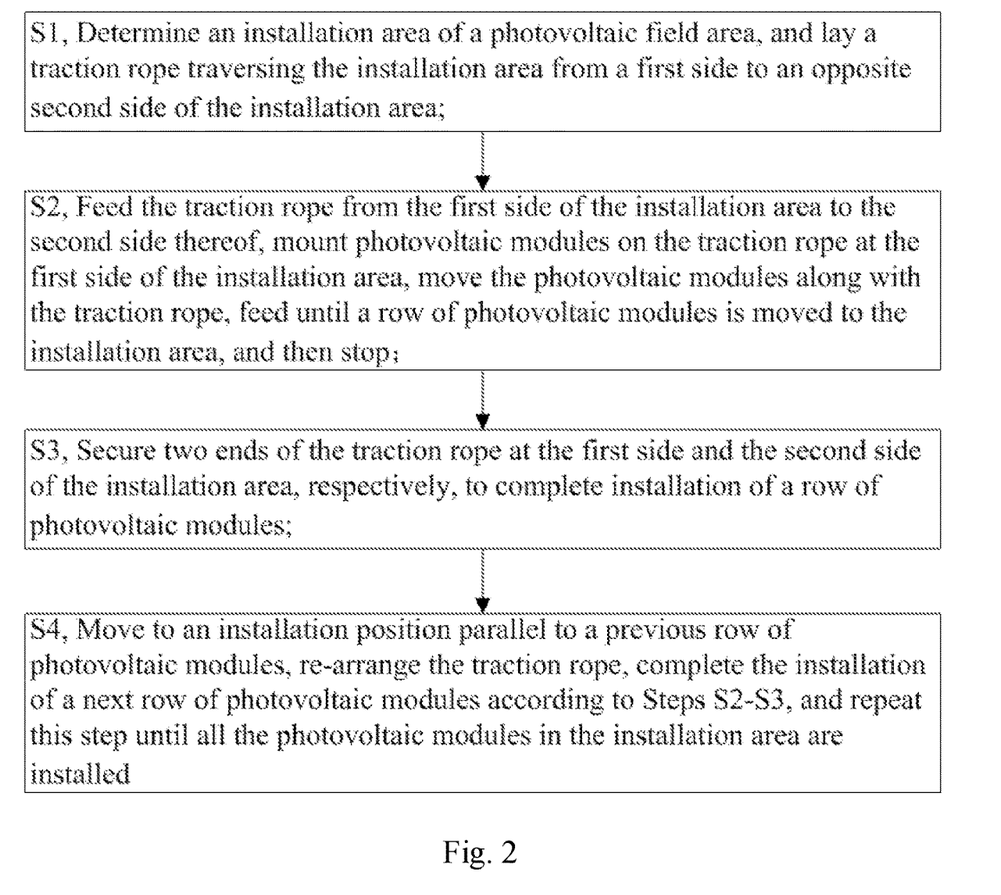
FIG. 2 is a step diagram of an installation method for a photovoltaic module in a photovoltaic field area according to Embodiment 3 of the present invention.

With reference to FIG. 2, the present embodiment is carried out on the basis of Embodiment 2. On the basis of embodiment 2, the installation is performed for the installation of multiple rows of photovoltaic modules 8 or the installation area of the whole photovoltaic field area, including Steps S1-S3 of an installation method for the photovoltaic module in the photovoltaic field area in Embodiment 2, in addition to completing the above-mentioned steps, further including the following steps:

S4, the unwinding device 1 and the winding device 4 move along the edge of the boundary of the photovoltaic field area to a next installation position parallel to a previous row of photovoltaic modules 8; when the unwinding device 1 and the winding device 4 move, they move by a track sliding mode; a track groove is concavely disposed at the bottom of the unwinding device 1, the winding device 4 and the unloading apparatus 2, and a track 7 matching the track groove is provided on the installed platform, or the track groove the track 7 are disposed at the bottom of the winding device 4; the unwinding device 1 and the unloading apparatus 2 shares a base with the track 7, and the track groove and the track 7 are provided at the bottom of the base; in this way, it can be ensured that the unwinding device 1, the winding device 4 and the unloading apparatus 2 move in a direction perpendicular to the traction rope 5; after moving into position, the traction rope 5 is re-arranged, so that two ends of the traction rope 5 are still connected to the output end of the unwinding device 1 and the input end of the winding device 4; the installation of the next row of photovoltaic modules 8 is completed according to Steps S2-S3, and this step is repeated until all the photovoltaic modules 8 in the photovoltaic field area have been installed; after the installation is completed, there are multiple rows of photovoltaic modules 8 between adjacent photovoltaic supports 6, and each row of photovoltaic modules 8 has multiple photovoltaic modules 8; by moving and re-arranging the traction rope 5, the whole process is flow-processed, and the installation process is standardized, so as to facilitate the installation of the photovoltaic module 8 at the next installation position, and then install a complete photovoltaic field area and accurately position each installation position, so as to ensure that the installation of the photovoltaic module 8 at the whole installation area is successfully completed.

Embodiment 4

This embodiment is based on Embodiments 1-3. This embodiment provides an installation equipment for a photovoltaic module in a photovoltaic field area, which is installed using the installation method for the photovoltaic module in the photovoltaic field area in Embodiments 1-3.

Figure 3:
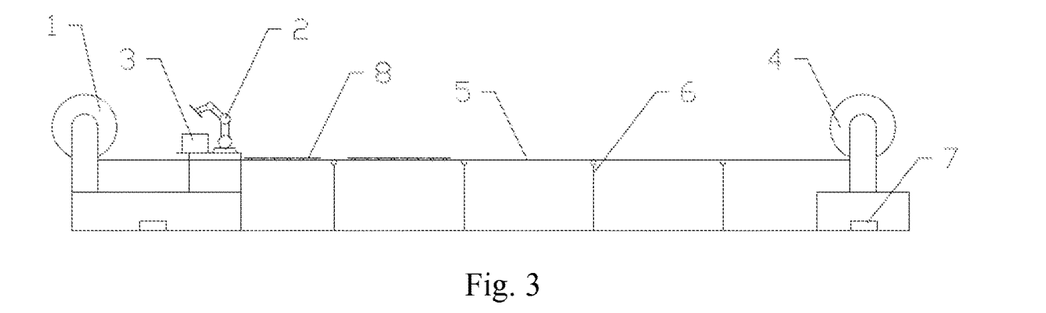
FIG. 3 is a schematic view of an installation equipment for a photovoltaic module in a photovoltaic field area according to Embodiment 4 of the present invention.

With reference to FIG. 3, the installation equipment includes an unwinding device 1, an unloading apparatus 2, a stock bin 3, a winding device 4, a traction rope 5, a photovoltaic support 6, and a track 7. The unwinding device 1 and the winding device 4 are respectively installed and fixed at two ends of a photovoltaic field area, and the photovoltaic support 6 is located between the two ends. The unwinding device 1 and the winding device 4 are connected via the traction rope 5. The unwinding device 1 and the winding device 4 are respectively instruments having the function of storing a rope, and are existing products. The unwinding device 1 and the winding device 4 are provided with two groups, the number of which is the same as the number of the traction rope 5. The traction rope 5 is wound on the unwinding device 1. One end of the traction rope 5 is used for being connected to the winding device 4. The winding device 4 is used for storing the traction rope 5. The winding device 1 and the winding device 4 are both provided with a servo motor. By means of the servo motor, it is convenient to set a tension and a speed so that the traction rope 5 can be stably transmitted. A plurality of photovoltaic supports 6 are provided at intervals in the photovoltaic field area, and are fixed by means of piling or using screws. Two traction ropes 5 transverse the whole photovoltaic field area. During the storage, the two traction ropes 5 are synchronously transmitted from one end to the other end of the plurality of photovoltaic supports 6.

The unloading apparatus 2 and the stock bin 3 are mounted beside the unwinding device 1. The stock bin 3 is for placing the photovoltaic module 8 and has a storage opening. The unloading apparatus 2 is mounted beside the unwinding device 1 and is used for transferring the photovoltaic module 8 to the traction rope 5. The unloading apparatus 2 of the present embodiment is a suction cup-type mechanical hand, and the photovoltaic module 8 is taken out from the stock bin 3 and placed on the traction rope 5 via the mechanical hand. The mechanical hand is also an existing product, and a grab-type mechanical hand can also be used. The unloading apparatus 2 and the bottom of the unwinding device 1 share a base. The bottom of the base is provided with a track groove and a matching track 7, and the bottom of the winding device 4 is also provided with a track groove and a matching track 7. The above-mentioned two tracks 7 are both fixed on the installation plane of the photovoltaic field area, such as a platform erected on the ground, on the roof or in the air by means of screws, so that the unloading apparatus 2 and the unwinding device 1 can slide together in the direction perpendicular to the traction rope 5. The winding device 4 may slide in the direction perpendicular to the traction rope 5, so as to move to the next installation position after the installation at one installation position is completed. In addition, it is also possible to use a track 7 made of a ferrous material, the weight of which is sufficient to keep the unwinding device 1 and the winding device 4 from shifting, so that the track 7 is placed on the mounting platform without screw fixing.

Figure 4:
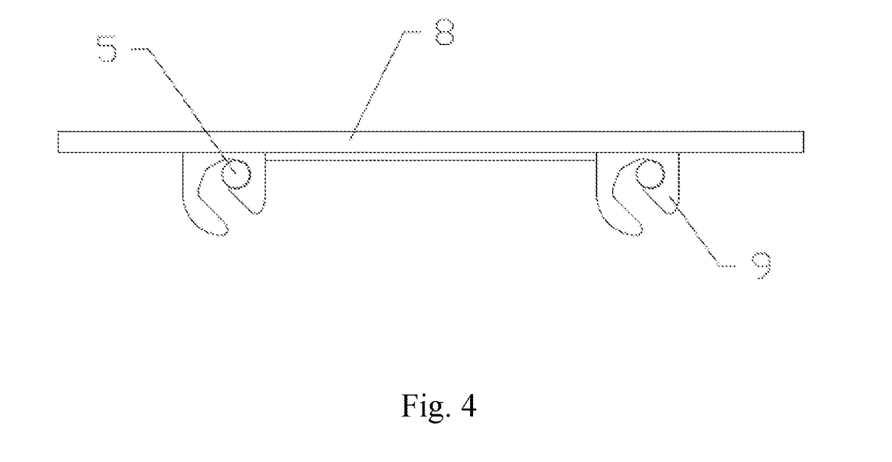
FIG. 4 is a schematic diagram of an assembly of a photovoltaic module and a traction rope according to Embodiment 4 of the present invention.

With reference to FIG. 4, the photovoltaic module 8 and the traction rope 5 are clamped and fixed by using a snap-fit structure 9. The snap-fit structure 9 is attached to the bottom surface of the photovoltaic module 8 and is pre-arranged. The snap-fit structure 9 is of a special design. The snap-fit structure 9 is provided with a notch. The notch is special-shaped, and the shape of the notch is bent so as to clamp the traction rope 5. Specifically, the snap is sheet-shaped, and the notch is formed by opening the bottom of the snap at a side surface position and being concave inward. The bent shape of the notch is arranged so that the inner side of the bent shape forms a pointed structure on the snap. The top of the pointed structure serves to support the traction rope 5 as it is clamped to the innermost end.

The photovoltaic module 8 being installed by the installation equipment of the present embodiment requires attaching the snap-fit structure 9 on the bottom of the photovoltaic module 8, which can be fixed by a mechanical hand. Specifically, after the mechanical hand sucks the photovoltaic module 8, the two snap-fit positions are directly opposite to the two traction ropes 5, and then the mechanical hand travels along a bending path. Namely, after the traction ropes 5 are initially clamped into the notches, the mechanical hand firstly moves obliquely downwards, and then moves in the opposite direction, so that the traction ropes 5 enter and are clamped by the innermost ends of the notches along the bent notches. An adhesive plate is attached on the bottom of the photovoltaic module 8. In addition, the snap-fit structure 9 is fixed at each of the four corners of the bottom of the adhesive plate. The snap-fit structure 9 is provided with a notch which is shaped so as to clamp the traction rope 5. Two snaps are arranged at intervals. When the photovoltaic module 8 is installed on the traction rope 5 via the snap-fit structure 9, two traction ropes 5 are just clamped into and fixed by the two notches, and then the photovoltaic module 8 is transmitted together with the traction rope 5.

Embodiment 5

This embodiment is based on Embodiments Examples 1-3. This embodiment provides a photovoltaic array for a photovoltaic module in a photovoltaic field area using the installation method for the photovoltaic module in the photovoltaic field area in Embodiments 1-3.

Figure 5:
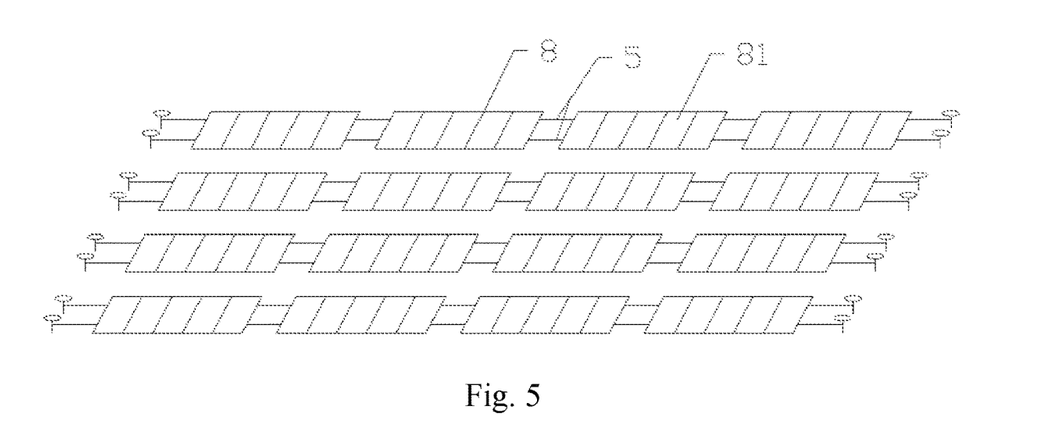
FIG. 5 is a schematic diagram of a photovoltaic array according to Embodiment 5 of the present invention.

Referring to FIG. 5, the photovoltaic array includes at least two traction ropes 5 and at least one row of photovoltaic modules 8. In the present embodiment, eight traction ropes 5 and four rows of photovoltaic modules 8 are used. Two ends of each traction rope 5 are fixed on an installation area via a pin. One row of photovoltaic modules 8 is divided into four groups. Each group of photovoltaic modules 8 is arranged along the direction of the traction ropes 5. Each group of photovoltaic modules 8 includes five photovoltaic plates 81 arranged side by side. An interval is provided between adjacent groups of photovoltaic modules 8. The width of the interval is less than the width of the two photovoltaic plates 81, and all the photovoltaic modules 8 are arranged in an array on the traction ropes 5 to form a photovoltaic array of 4×4. The photovoltaic array arranged in four rows and four columns is obtained by using the installation method. The photovoltaic array of four rows and four columns may completely cover most positions of the photovoltaic field area, providing a large-area photovoltaic module 8 working area.

The above mentioned are only preferred embodiments of the invention and is not intended to limit the invention. Any modification, equivalent substitution and improvement made within the spirit and principles of the invention shall be covered by the protection of the invention.

What is claimed is:

1. An installation method for photovoltaic modules in a photovoltaic field area, comprising the steps of:
   S1, determining an installation area of the photovoltaic field area, and laying two traction ropes traversing the installation area from a first side to an opposite second side of the installation area;
   S2, arranging an unwinding device on the first side of the installation area and a winding device on the second side of the installation area; providing a track on each of the first side and the second side of the installation area, installing the unwinding device on the track on the first side and the winding device on the track on the second side, wherein the unwinding device and the winding device are movable relative to the installation area in a sliding manner; feeding the two traction ropes from the first side of the installation area to the second side thereof, mounting and fixing the photovoltaic modules on the two traction ropes at the first side of the installation area, moving the photovoltaic modules along with the two traction ropes, and feeding the two traction ropes and the photovoltaic modules until a row of the photovoltaic modules is moved to the installation area, and then stopping; and
   S3, securing two ends of each of the two traction ropes at the first side and the second side of the installation area, respectively, to complete the installation of the row of photovoltaic modules, wherein:
   the unwinding device and the winding device are arranged and installed in two groups along with another unwinding device and another winding device,
   the two traction ropes are wound on the unwinding device and the another unwinding device,
   one of the two ends of each of the two traction ropes is connected to the winding device and the another winding device, and
   each of the winding device, the another winding device, the unwinding device and the another unwinding device includes a servo motor that sets a tension and a speed for the two traction ropes.

2. The installation method for the photovoltaic modules in the photovoltaic field area according to claim 1, further comprising installing a next row or more rows of photovoltaic modules by the step of:
   S4, moving to an installation position parallel to the row of photovoltaic modules, re-arranging the two traction ropes, installing the next row of photovoltaic modules according to Steps S2-S3, and repeating step S4 until all of the photovoltaic modules are installed in the installation area.

3. The installation method for the photovoltaic modules in the photovoltaic field area according to claim 1, wherein Steps S2-S3 further comprise keeping the two traction ropes under tension while feeding the two traction ropes from the first side of the installation area to the second side thereof and feeding the two traction ropes and the photovoltaic modules until the installation is completed.

4. The installation method for the photovoltaic modules in the photovoltaic field area according to claim 3, wherein in Step S2, the photovoltaic modules are mounted and fixed on the two traction ropes in sequence as a group; the method further comprises installing multiple ones of the group of the photovoltaic modules; at least one of the photovoltaic modules is installed at a time; and the photovoltaic modules of adjacent ones of the multiple ones of the group are installed at intervals.

5. The installation method for the photovoltaic modules in the photovoltaic field area according to claim 4, wherein in Step S1, the distance between the two traction ropes is less than a length or width of one of the photovoltaic modules; and
   the distance between the two traction ropes is kept constant.

6. The installation method for the photovoltaic modules in the photovoltaic field area according to claim 3, wherein in Step S2, the two ends of each of the two traction ropes are respectively connected to the unwinding device and the winding device; the two traction ropes are fed by the unwinding device and the winding device synchronously receives the two traction ropes to complete the feeding of the two traction ropes from the first side to the second side; and in Step S3, the two traction ropes are firstly disconnected from the unwinding device and the winding device, and then the two ends of the two traction ropes are fixed.

7. The installation method for the photovoltaic modules in the photovoltaic field area according to claim 3, wherein Step S1 further comprises, before laying the two traction ropes, laying a plurality of photovoltaic supports in the installation area; and resting the traction ropes on the photovoltaic supports; wherein the two traction ropes are fed in a direction that coincides with an arrangement direction of the plurality of photovoltaic supports.

8. Equipment for installing a row of photovoltaic modules in a photovoltaic field area, comprising an unwinding device and a winding device arranged and installed in a first group, another unwinding device and another winding device arranged and installed in a second group, two traction ropes, a plurality of photovoltaic supports, a stock bin, an unloading apparatus, and first and second tracks on which the unwinding device and the winding device are respectively installed; wherein the plurality of photovoltaic supports are provided at intervals in an installation area of the photovoltaic field area; the two traction ropes together traverse the plurality of photovoltaic supports; the unwinding device and the another unwinding device are at one end outside the photovoltaic field area, and the winding device and the another winding device are at another end outside the photovoltaic field area; each of the unwinding device, the another unwinding device, the winding device and the another winding device have a bottom in contact with the respective first or second track along an edge of the installation area; one of the two ends of the two traction ropes are respectively connected to the winding device and the another winding device, wherein the two traction ropes are wound on the unwinding device and the another unwinding device, the unwinding device and the another unwinding device feed the two traction ropes, and the winding device and the another winding device receive the two traction ropes; the stock bin and the unloading apparatus are mounted beside the unwinding device; the photovoltaic modules are placed in the stock bin; the unloading apparatus transfers the photovoltaic modules from the stock bin to the traction rope, and each of the winding device, the another winding device, the unwinding device and the another unwinding device includes a servo motor that sets a tension and a speed for the two traction ropes.

9. The equipment according to claim 8, further comprising a plurality of snap-fit structures that clamp or fix the photovoltaic modules to the two traction ropes.

10. The installation method according to claim 1, wherein each of the two traction ropes comprises a metal material or a metal wire made of an alloy.

11. The installation method according to claim 10, wherein each of the two traction ropes comprises the metal material, and the metal material comprises iron, aluminum, or copper.

12. The installation method according to claim 11, wherein each of the two traction ropes comprises a ferruginous steel rope.

13. The installation method according to claim 1, wherein the unwinding device and the winding device are located at a same horizontal height, to ensure a horizontal installation of the photovoltaic modules.

14. The installation method according to claim 4, wherein each of the multiple groups includes 3-10 of the photovoltaic modules.

15. The installation method according to claim 1, wherein each of the photovoltaic modules includes four pre-set snap-fit structures on a bottom surface thereof, and each of the snap-fit structures has a notch for clamping and fixing one of the two traction ropes therein.

16. The installation method according to claim 1, wherein the two traction ropes are fed to the installation area of the photovoltaic field area by synchronous transmission of the two traction ropes from the first side to the second side of the installation area by the unwinding device and the winding device.

17. The installation method according to claim 1, wherein the other of the two ends of the two traction ropes are connected to the winding device and the other winding device, and the two traction ropes are stored on the winding device and the other winding device.

18. The installation method according to claim 1, wherein the photovoltaic modules are mounted and fixed on the two traction ropes, then moved along with the two traction ropes, until the row of the photovoltaic modules is moved to the installation area.

* * * * *